United States Patent [19]

Lew

[11] Patent Number: 4,562,993
[45] Date of Patent: Jan. 7, 1986

[54] DUAL ACTION HANDLE FOR FLOATING DISC VALVE AND BALL-PLUG VALVE

[76] Inventor: Hyok S. Lew, 7890 Oak St., Arvada, Colo. 80005

[21] Appl. No.: 614,292

[22] Filed: May 25, 1984

Related U.S. Application Data

[63] Continuation-in-part of Ser. No. 417,484, Aug. 31, 1982, Pat. No. 4,450,732.

[51] Int. Cl.[4] ............................................. F16K 39/02
[52] U.S. Cl. ................................. 251/161; 251/188; 251/229
[58] Field of Search ................... 251/88, 98, 158, 160, 251/161, 164, 165, 187, 188, 192, 219, 220, 222, 223, 225, 229; 74/424.8 R, 424.8 VA, 471 XY

[56] References Cited

U.S. PATENT DOCUMENTS

| | | | |
|---|---|---|---|
| 1,848,369 | 3/1932 | Mohr | 251/164 |
| 2,612,340 | 9/1952 | Laurent | 251/161 |
| 2,655,339 | 10/1953 | Smith | 251/187 |
| 2,865,597 | 12/1958 | Lucas | 251/187 |
| 4,203,460 | 5/1980 | Priese | 251/161 X |

*Primary Examiner*—A. Michael Chambers
*Assistant Examiner*—John C. Fox

[57] ABSTRACT

This invention relates to a valve handle having the dual function of rotating the valve stem for opening and closing of the valve and of moving the valve stem in the axial direction over a small distance for relieving and establishing the seating pressure between the valve seat and the blocking body such as the floating disc in the floating disc valve and the ball-plug in the ball-plug valve.

2 Claims, 15 Drawing Figures

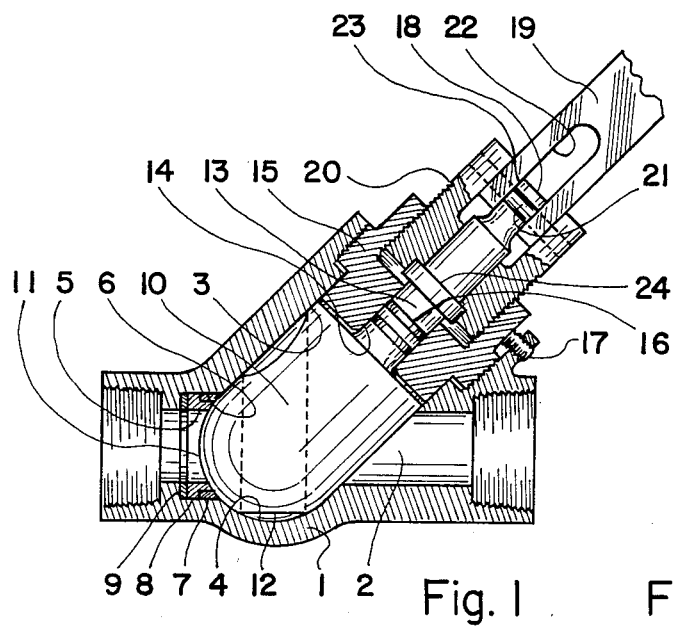
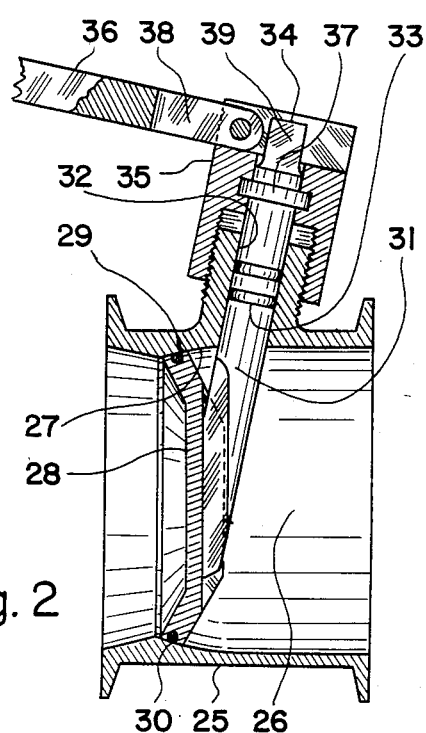
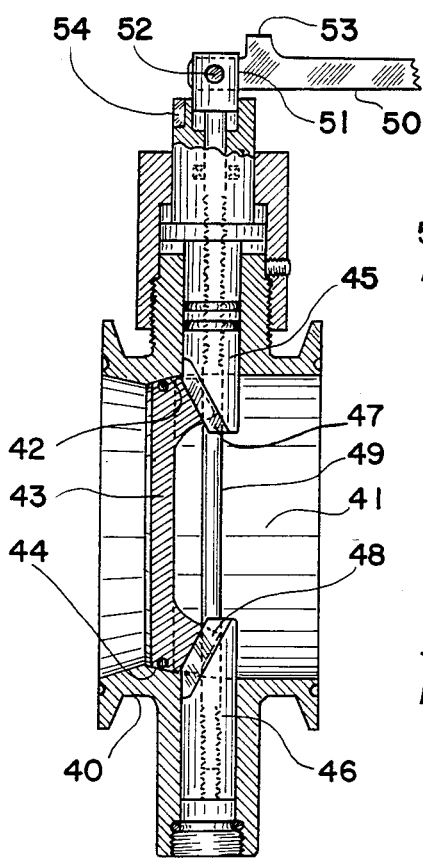
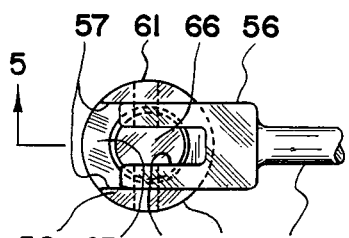
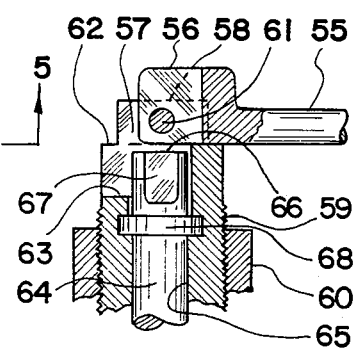
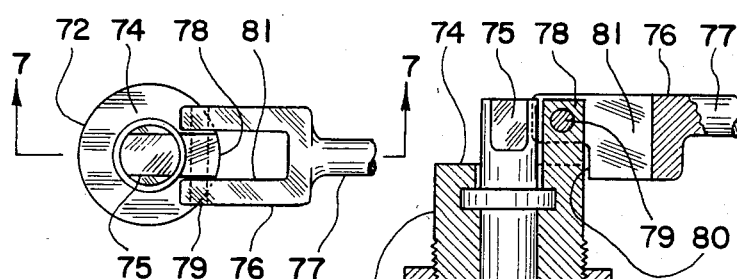
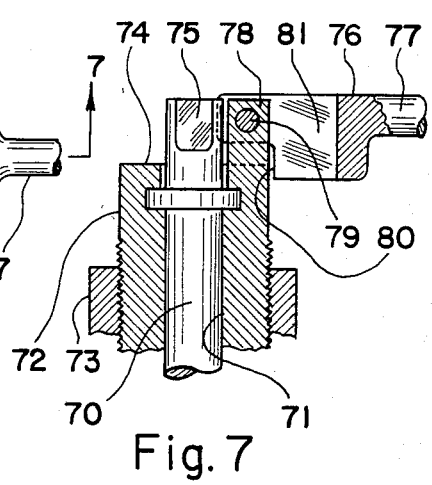
Fig. 1
Fig. 2
Fig. 3
Fig. 4
Fig. 5
Fig. 6
Fig. 7

4,562,993

DUAL ACTION HANDLE FOR FLOATING DISC VALVE AND BALL-PLUG VALVE

BACKGROUND OF THE INVENTION

For more than a century, the valve industry has been blindly following its tradition in making valves such as the butterfly valves, ball valves and plug valves, which are conceived and designed in a reasoning process that lacks cleverness and resourcefulness. The valve seat and the blocking body such as the disc in the butterfly valve, ball in the ball valve and the cylindrical plug in the plug valve, continuously rub each other during the opening and closing of those valves and, consequently accelerates the abrasion and wear of the seating surfaces in these valves. The present day valve industry is witnessing the dawning of a new era wherein daring and intelligent new concepts are being introduced into the design and manufacturing of valves. One example that stands out as such a new direction in valve technology is the invention of the "Floating Disc Valve", which is a butterfly valve with variable seating pressure that is relieved and established by the axial movement of the valve stem while the traditional rotational movement of the valve stem opens and closes the valve. Another example is the ball-plug valve that works like a ball valve while it has the structural strength of the cylindrical plug valve. The seating pressure between the valve seat and the ball-end of the ball-plug is relieved or established by a minute amount of axial movement of the valve stem while the rotational movement of the valve stem opens and closes the ball-plug valve. There is little doubt that other new valves which utilize the axial movement of the stem for relieving and establishing the seating pressure and the rotational movement for opening and closing the valve, will emerge. Therefore, there is a demand for a novel arrangement of a dual action valve handle which imposes linear and angular motion on the valve stem.

The primary object of the present invention is to provide a valve handle that imposes linear movement on the valve stem under one position of the valve handle and imposes rotational movement on the valve stem under the other position of the valve handle.

Another object of the present invention is to provide a dual action valve handle that generates linear movement on the valve stem by using a jack screw mechanism providing a powerful mechanical advantage.

A further object is to provide a dual action valve handle capable of relieving and establishing the seating pressure in the valve in an easy manner in spite of the powerful resistance against such a manipulation created by fluid pressure.

Yet another object is to provide a dual action valve handle of simple mechanical structure and fool-proof operation.

Yet a further object is to provide a dual action valve handle that is ecomonic, light-weight, compact and easy to manufacture.

These and other objects of the present invention will become evident as the description of the present invention proceeds.

BRIEF DESCRIPTION OF THE FIGURES

The present invention may be described with a greater clarity and specificity by referring to the following Figures:

FIG. 1 illustrates a cross section of a ball-plug valve that utilizes a dual action handle.

FIG. 2 illustrates a cross section of a floating-disc valve that employs a dual action handle.

FIG. 3 illustrates a cross section of another floating-disc valve utilizing a dual action handle.

FIG. 4 illustrates a plan view of the arrangement of a dual action handle.

FIG. 5 illustrates a cross section of the dual action handle of FIG. 4 taken along a plane 5—5 as shown in FIG. 4.

FIG. 6 illustrates a plan view of the arrangement of another dual action handle.

FIG. 7 illustrates a cross section of the dual action handle of FIG. 6 taken along a plane 7—7 as shown in FIG. 6.

SPECIFICATION

Figure 8:
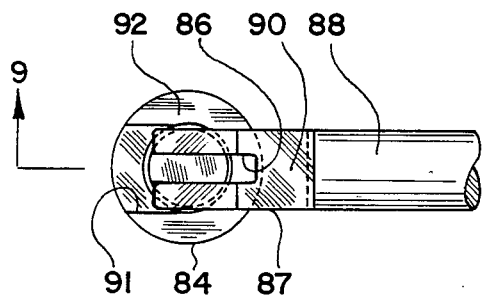
FIG. 8 illustrates a plan view of the arrangement of a further dual action handle.

In FIG. 1, there is illustrated a cross section of a ball-plug valve taken along a plane including the central axis of the flow passage and the central axis of the ball-plug. The valve body 1 of the ball-plug valve includes a flow passage 2 extending through the valve body and a cylindrical cavity 3 with a closed substantially hemispherical end 4 disposed in 45 degree angle with respect to the fluid passage 2. The center of the hypothetical spherical surface including the closed substantially hemispherical end 4 of the cylindrical cavity 3 substantially coincides with the central axis of the flow passage 2. A resilient annular seal 5 is disposed within a counter-bore 6 bored coaxially to the fluid passage 2 located adjacent to the closed substantially hemispherical end 4 of the cylindrical cavity 3. The resilient annular seat shown in this particular embodiment is a fire-proof design including a soft seal 7 made of a soft elastic material supported by a hard seal 8 made of a metal. The gasket 9 made of a soft elastic material disposed at the bottom of the counter-bore 6 provides a leak-proof cushion for the combination of the soft seal 7 and hard seal 8. The ball-plug 10 with a substantially hemispherical end 11 engages the cylindrical cavity 3 in close tolerance. A through-hole 12 having a diameter the same as the diameter of the fluid passage 2 is disposed through the ball plug 10 wherein the central axis of the through-hole 12 substantially intersects the central axis of the ball-plug 10 in a 45 degree angle. The valve stem 13 coaxially extending from the ball-plug extends through a hole 14 centrally located in a cap 15 in a leak-proof manner as facilitated by the resilient annular seal 16. The cap 15 is threadedly connected to the valve body 1 and includes a set screw 17 that locks said threaded connection. The outer extremity 18 of the valve stem 13 includes a dual action handle assembly comprising a lever handle 19 and a jack-screw 20 anchored in the cap 15 in a threaded relationship wherein the lever handle 19 is connected to the jack-screw 20 by the pin 21 secured in the jack-screw and pivotably engaged by the lever handle. The pin 21 is off-set from the valve stem 13. When the lever handle 19 is flipped down to one position perpendicular to the valve stem 13, the slotted opening 22 disposed near the extremity of the lever handle 19 adjacent to the pivoting pin 21 engages the wrench flat 23 included on the outer extremity of the valve stem 13 and, consequently, the turn of the lever handle 19 rotates the ball plug. When the lever handle 19 is flipped to the other position perpendicular to the valve stem 13 diametrically opposite to said one position, the slotted opening 22 of the lever handle 19 disengages the wrench flat 23 and, consequently, the lever handle 19 can be used to operate the jack-screw 20 without rotating the ball-plug. After rotating the ball-plug to the closed position as shown in FIG. 1 and flipping over the lever handle to said other position, the lever handle 19 is used to jack down the jack-screw 20 to press down the ball-plug 10 that establishes a bubble-tight contact between the resilient annular seat and the hemispherical end of the ball plug. In opening the valve, the seating pressure between the resilient annular seat and the hemispherical end of the ball-plug is relieved by jacking up the jack screw and, then, the lever handle is flipped over to said one position and turned over a 180 degree angle that rotates the ball-plug to the fully open position. In the particular embodiment of the dual action valve handle shown in FIG. 1, the jack-screw 15 is arranged in such a way that it actively presses down the ball-plug onto the valve seat, while the seating pressure is passively relieved when the jack-screw is jacked up. The jack screw does not actively lift the ball-plug because the collar 24 rigidly dispsoed around the valve stem 13 is linked to the jack-screw 20 in one way only. By confining the collar disposed on the valve stem within the jack screw in two ways, the jack-screw can be used to establish and relieve the seating pressure between the valve seat and the hemispherical end of the ball-plug in an active and positive way.

In FIG. 2, there is shown a cross section of a floating disc valve taken along a plane including the central axis of the flow passage and the central axis of the valve stem. The valve body 25 includes a flow passage 26 with a spherical seat 27. The cupped disc 28 with a spherical rim 29 inlcuding a resilient annular seal 30 is disposed intermediate the plane including the spherical seat 27 and the center of the spherical surface including the spherical seat 27 wherein the spherical rim 29 of the cupped disc 28 establishes a precise contact with the spherical seat 27 when the cupped disc 28 is rotated to the fully closed position as shown in FIG. 2. The cupped disc 28 is connected to the inner extremity of the valve stem 31 in a sliding relationship facilitated by the dove-tail joint wherein the only possible relative movement between the disc 28 and the valve stem 31 is a sliding movement in the direction substantially parallel to the plane including the spherical rim of the cupped disc along a plane including the central axis of the cupped disc and that of the valve stem, while any relative rotational movement therebetween is prohibited. The central axis of the valve stem 31 passes through the center of the spherical surface including the spherical seat 27 and intersects the central axis of the flow passage 26 in an oblique angle as the valve stem 31 extends through a hole 32 disposed in the stem housing affixed to the valve body in an oblique angle in a leak-proof manner facilitated by the resilient annular seal 33. The outer extremity 34 of the valve stem is connected to a jack-screw 35 with a lever handle 36, whose combination works in the same principle as that described in conjunction with FIG. 1. The dual action handle comprising the jack-screw 35 and the lever handle 36 produces the axial inward and outward movement on the valve stem 31 as the collar 37 on the valve stem is confined within the jack-screw 35 in two-ways. When the lever handle 36 is flipped to one position as shown in FIG. 2, the valve stem 31 can be moved inward or outward of the valve body by turning the lever handle in either direction without rotating the cupped disc 28. When the lever handle 36 is flipped over to the other position diametrically opposite to said one position, the slotted opening 38 included in the lever handle 36 engages the wrench flat 39 disposed on the outer extremity of the valve stem and, consequently, enables one to rotate the cupped disc 28 by turning the lever handle 36 in opening and closing the valve. In order to obtain a bubble-tight shut-off, the seating pressure between the spherical seat 27 and the spherical rim 29 of the cupped idsc 28 is established after rotating the cupped disc 28 to the fully closed position and turning the lever handle in one direction after flipping it over to said one position disengaged from the wrench flat 39 of the valve stem 31. The seating pressure is relieved before opening the valve by turning the lever handle in the other direction opposite to said one direction, whereupon the lever handle is flipped over to said other position engaging the wrench flat on the valve stem and the cupped disc is rotated to an open position by turning the lever handle. It should be mentioned that the linear movement of the valve handle in the axial direction in one or another direction results in the movement of the cupped disc away from or toward to the plane including the spherical seat and, consequently, enables one to establish or relieve the seating pressure between the spherical seat 27 and the spherical rim 28 of the cupped disc 28.

In FIG. 3, there is illustrated a cross section of another floating disc valve taken along a plane inlcuding the central axis of the flow passage and the central axis of the valve stem. This floating disc valve includes the valve body 40 inlcuding a flow passage 41 with a spherical seat 42 and a disc 43 with a spherical rim 44 matched to the spherical seat 42. The disc 43 is connected to a pair of stub stems 45 and 46 in a sliding relationship by means of pair of dove-tail joints 47 and 48 disposed on two slanted planes with respect to the plane including the spherical rim of the disc in a mirror image to one another in the diametrical sense. As a consequence, the movement of two stub stems 45 and 46 away from one another pulls the disc 43 away from the spherical seat 42 and thus relieves the seating pressure therebetween, while the movement toward one another presses the disc 43 onto the spherical seat 42 and thus establishes the seating pressure. The relative movement between two stub stems 45 and 46 is generated by the jack-screw rod 49 threadedly engaging two stub stems coaxially in the right and left handed threads, respectively. The lever handle 50 is pivotably connected to the slotted outer extremity 51 of the jack-screw rod 49 by means of the pin 52 installed perpendicular to the central axis of the jack-screw rod. When the lever handle 50 is flipped to one position as shown in FIG. 3, the lever handle is disengaged from the valve stem 45 enabling one to rotate the jack-screw rod 49 without rotating the valve stems 45 and 46. When the lever handle 50 is flipped over to the other position diametrically opposite to said one position, the key 53 disposed on the lever handle 50 engages the key-slot disposed on the outer extremity of the stub stem 45 and, consequently, the valve can be opened and closed by turning the lever handle. The dual action valve handle enables one to establish the seating pressure between the spherical seat and the valve disc to a level guaranteeing the bubble-tight shut-off that makes it impossible to rotate the valve disc without seriously damaging the valve seat and/or the rim of the valve disc. The dual action valve handle also enables one to relieve the seating pressure completely whereby the valve disc can be rotated without causing any abrasion and wear to the valve seat and the rim of the valve disc. Therefore, the dual action valve handle plays an important role in bringing the new generation of valve technology.

There is shown in FIG. 4 a plan view of a dual action valve handle and a cross section thereof in FIG. 5 taken clong a plane 5—5 as shown in FIG. 4. The forked extremity 56 of the lever handle 55 is disposed within a groove 57 formed into the end face 58 of the jack-screw 59 threadedly connected to the stem housing 60 affixed to the valve body and pivotably connected to the jack-screw 59 by the pin 61 installed perpendicular to the central axis of the jack screw 50. The pin 61 is off-set from the geometrical center line of the forked extremity 56 of the lever handle 55. The bottom 62 of the groove 57 includes a depression 63 on one half of the bottom of the groove as it is divided by the pin 61. The valve stem 64 rotatably engages a hole 65 coaxially disposed within the jack-screw 59 wherein the outer end 66 of the valve stem 65 remains below the bottom 62 of the groove 57. The outer extremity of the valve stem 64 inlcudes a wrench flat 67. The collar 68 rigidly affixed around the valve stem 64 is confined within the jack-screw 59 and, consequently, the valve stem 64 moves with the jack-screw 59 in their movement in the axial direction, while they are allowed to rotate relative to one another. When the lever handle 55 is flipped to one position perpendicular to the valve stem as shown in FIG. 5, it is disengaged from the wrench flat 67 of the valve stem 64 and, consequently, the jack-screw 59 can be operated by turning the lever handle 55 without rotating the valve stem. When the lever handle 55 is flipped over to the other position diametrically opposite to the position shown in FIG. 5, the forked extremity 56 of the lever handle 55 pivots into the depression 63 wherein the wrench flat 67 of the valve stem 64 engages the slotted opening 69 of the forked extremity 56 of the lever handle 55, whose engagement enables one to rotate the valve stem 64 by turning the lever handle 55. The dual action valve handle illustrated in FIGS. 4 and 5 may be employed in the construction of those valves shown in FIGS. 1 and 2.

There is illustrated in FIG. 6 a plan view of another dual action valve handle and a cross section thereof in FIG. 7 taken along a plane 7—7 as shown in FIG. 6. The valve stem 70 rotatably and nonslidably engages and extends through a hole 71 coaxially disposed withon a jack-screw 72 threadedly connected to the stem housing 73 rigidly connected to the valve body. The outer extremity of the valve stem 70 extending beyond the end face 74 of the jack-screw 72 includes a wrench flat 75. The forked extremity 76 of the lever handle 77 is pivotably connected to a post 78 affixed to the end face of the jack-screw by a pin 79 installed perpendicular to the central axis of the valve stem. When the lever handle 77 is flipped over to one position disengaged from the valve stem 70, the step 80 included in the forked extremity 76 of the lever handle 77 comes in contact with the outer cylindrical surface of the jack-screw 72 and thus keeps the lever handle 77 at a position perpendicular to the valve stem 70. When the lever handle 77 is flipped over to the other position diametrically opposite to the position shown in FIG. 7, the wrench flat 75 of the valve stem 70 emgages the slotted opening 81 included in the forked extremity 76 of the lever handle 77. This dual action valve handle is usable in conjunction with those valves shown in FIGS. 1 and 2.

Figure 9:
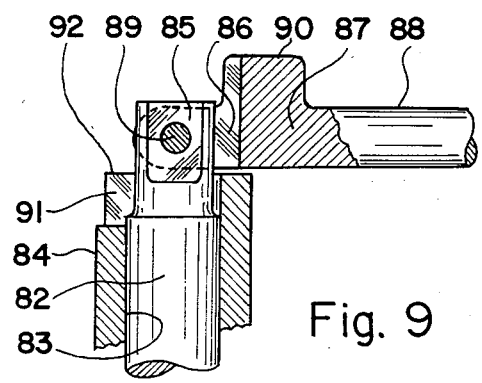
FIG. 9 illustrates a cross section of the dual action handle of FIG. 8 taken along a plane 9—9 as shown in FIG. 8.

There is shown in FIG. 8 a plan view of a further dual action valve handle and a cross section thereof in FIG. 9 taken along plane 9—9 as shown in FIG. 8. The jack-screw rod 82 threadedly connected to both stub stems as shown in FIG. 3 extends through a hole 83 coaxially disposed within one stub stem 84. The flattened outer extremity 85 of the jack-screw rod 82 engages pivotably the slotted opening 86 included in the forked extremity 87 of the lever handle 88 as a pin 89 disposed perpendicular to the jack-screw rod 82 provides a connection therebetween. The forked extremity 17 of the lever handle 88 includes a key 90 that engages a key-slot 91 included on the outer end face 92 of the stub stem 84 when the lever handle 88 is flipped over to the other position diametrically opposite to one position as shown in FIG. 9. When the lever handle is flipped over to one position as shwon in FIG. 1, it is disengaged from the stub valve stem and, consequently, the jack-screw rod can be operated to establish or relieve the seating pressure of the valve without rotating the valve disc. When the lever handle is flipped over to the other position diametrically opposite to said one position, the stub stem can be rotated by turning the lever handle as the key 90 of the lever handle 88 engages the key-slot 91 of the stub stem 84 and, consequently, the valve disc can be rotated to an open or closed position. The dual action valve handle illustrated in FIGS. 8 and 9 is for the floating disc valve shown in FIG. 3.

Figure 10:
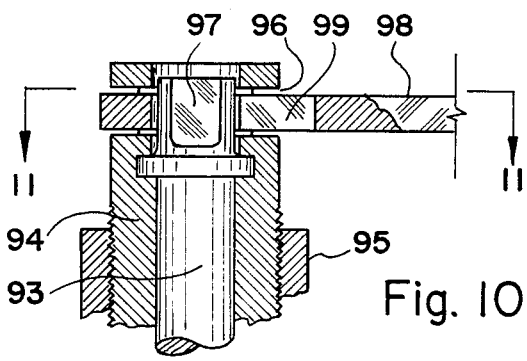
FIG. 10 illustrates a cross section of yet another dual action valve handle.
Figure 11:
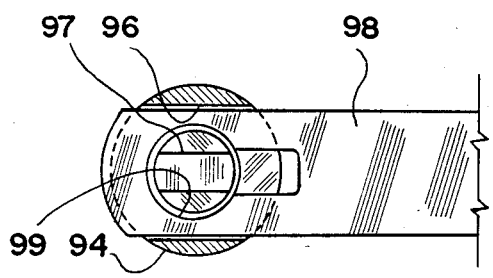
FIG. 11 illustrates another cross section of the dual action valve handle of FIG. 10 taken along a plane 11—11 as shown in FIG. 10.

There is illustrated in FIG. 10 a cross section of yet another dual action valve handle and in FIG. 11 another cross section thereof taken along a plane 11—11 as shown in FIG. 10. The valve stem 93 is rotatably and nonslidably disposed coaxially within the jack-screw 94 threadedly connected to the stem housing 95 of the valve body. The outer extremity of the jack-screw 94 includes retangular through-hole 96 with an width significantly greater than the diameter of the valve stem 93, that is disposed perpendicular to the central axis of the jack-screw 94. The outer extremity of the valve stem 93 includes a wrench flat 97. The lever handle 98 including a key-hole shaped opening 99 disposed near one extremity thereof engages slidably the rectangular through-hole 96 wherein the valve stem 93 extends through the key-hole shaped hole 99. The diameter of the circular portion of the key-hole shaped opening 99 is slightly greater than the diameter of the valve stem 93 and the slotted portion of the key-hole shaped opening 99 is slightly greater than the thickness of the wrench flat 97 of the valve stem 93. When the lever handle 98 is pulled to one position wherein the outer extremity of the valve stem 93 extends through the circular portion of the key-hole shaped opening 99, the jack-screw 94 can be operated without rotating the valve stem 93 by turning the lever handle 98 in either direction and, consequently, one can establish or relieve the seating pressure of the valve. When the lever handle 98 is pushed to another position wherein the wrench flat 97 of the valve stem 93 engages the slotted portion of the key-hole shaped opening 99, the valve stem 93 can be rotated by turning the lever handle and, consequently, one can open or close the valve. This type of the dual action valve handle is useable in conjunction with those valves shown in FIGS. 1 and 2.

Figure 12:
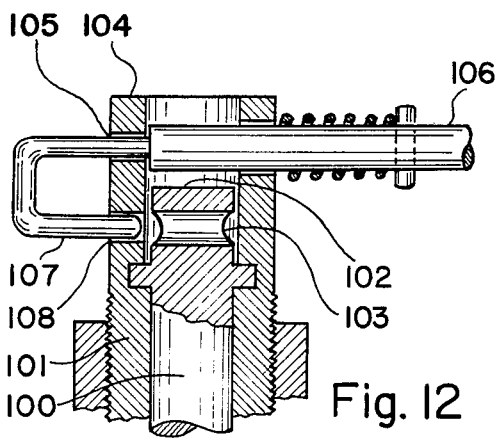
FIG. 12 illustrates a cross section of yet a further dual action handle.

In FIG. 12, there is shown a cross section of yet a further dual action valve handle. The valve stem 100 is rotatably and nonslidably disposed within the jack-screw 101 in a coaxial relationship. The outer end 102 of the valve stem 100 including a through-hole 103 disposed laterally through the valve stem 100 is located significantly below the outer end 104 of the jack-screw 101 including a through-hole 105 disposed laterelly through the jack-screw 101. The lever ahndle 106 slidably extends through the through-hole 105 included in the jack-screw 101 and its U-shaped extremity 107 engages another lateral hole 108 disposed through the jack-screw 101 at the same level as the through-hole 103 disposed through the valve stem 100. When the lever handle 106 is pulled to one extreme position, its U-shaped extremity 107 engages the through-hole 103 disposed through the valve stem and, consquently, the valve stem can be rotated by turning the lever handle. When the lever handle 106 is pushed to another extreme position, the U-shaped extremity 107 disengages the through-hole 103 and, consequently, the jack-screw can be operated by turning the lever handle without rotating the valve stem. This dual action valve handle is for those valves shown in FIGS. 1 and 2.

Figure 13:
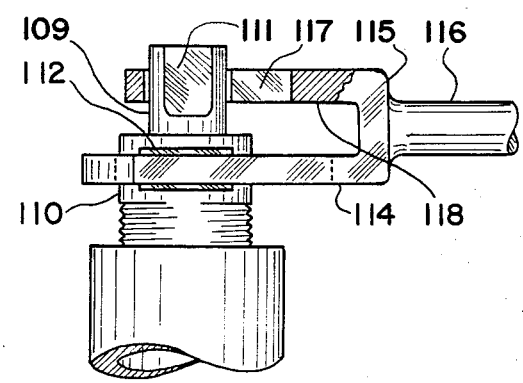
FIG. 13 illustrates still another dual action valve handle.
Figure 14:
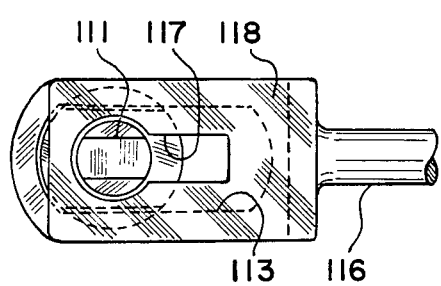
FIG. 14 illustrates a plan view of the dual action valve handle shown in FIG. 13.

In FIGS. 13 and 14, there is shown an elevation view and a plan view of still another dual action valve handle, respectively. The valve stem 109 rotatably and monslidably extends through the jack-screw 110 in a coaxial relationship wherein the outer extremity of the valve stem 109 including a wrench flat 111 protrude beyond the outer extremity of the jack-screw 110 including a wrench flat 112. The wrench flat 112 of the jack-screw 110 slidably and nonrotatably engages a slotted opening 113 disposed through one branch 114 of the tuning fork-like extremity 115 of the lever handle 116, while the outer extremity of the valve stem 109 extends through a key-hole shaped opening 117 disposed through another branch 118 of the turning fork-like extremity 115 of the lever handle 116. The diameter of the circular portion of the key-hole shaped opening 117 is slightly greater than the diameter of the valve stem and its slotted portion has an width slightly greater than the thickness of the wrench flat 111. This dual action valve handle operates in the same principle and has the same application as that shown in FIG. 10 and 11.

Figure 15:
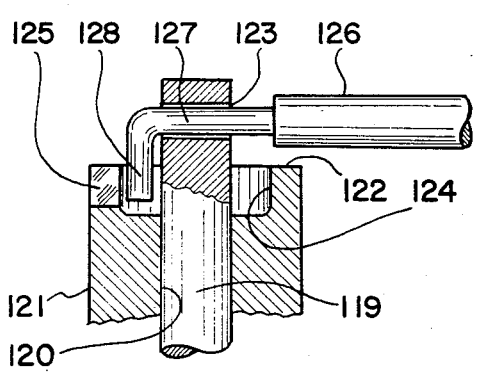
FIG. 15 illustrates still a further dual action valve handle.

In FIG. 15, there is illustrated a cross section of still a further dual action valve handle. The jack-screw rod 119 threadedly connected to both stub stems as illustrated in FIG. 3 extends through a hole 120 coaxially disposed within one stub stem 121 wherein its outer extremity protruding beyond the outer end face 122 of the stub stem 121 includes a through-hole 123 laterally disposed through the jack-screw rod 119. The outer extremity of the stub stem 121 has a counter-bore 124 coaxially disposed around the hole 120 and a slot 125.

The narrowed-down extremity 127 of the lever handle 126 slidably engages and extends through the through-hole 123 and is bent into L-shape wherein the tip 128 of the L-shaped portion engages the counter-bore 124. When the tip 128 of the L-shaped extremity 127 of the lever handle 126 stays in the counter-bore 124, the jack-screw rod 119 can be operated by turning the lever handle 126 without rotating the stub stem 121 which enables one to establish or relieve the seating pressure of the valve. When the lever handle is pushed to a position wherein the tip 128 of the L-shaped extremity 127 of the lever handle 126 engages the slot 125, the stub stem 121 can be rotated by turning the lever handle 126 and, consequently, one can open and close the valve.

While the principles of the present invention have now been made clear by the illustrative embodiments the utilization of the present invention shall not be limited to such illustrative embodiments only, as it will be immediately obvious that the skilled in the art may make modifications of the structure, arrangements, elements and materials which are particularly adapted to a specific working environment and operating condition in practicing the invention without departing from the principles of the present invention.

I claim:

1. A dual action valve handle comprising in combination:
   (a) a jack screw with a centrally disposed hole rotatably engaged by a valve stem, said jack screw threadedly connected to a stem housing rigidly affixed to a valve body wherein said valve stem rotatably and slidably engages and extends through a hole included in said stem housing;
   (b) an elongated member with one extremity connected to said jack screw in a pivoting relationship wherein said elongated member is pivotable about a pivoting axis substantially perpendicular to the central axis of said valve stem over a range intermediate a first position substantially perpendicular to the central axis of said valve stem and a second position substantially perpendicular to the central axis of said valve stem, wherein the sweeping motion of said elongated member about an axis substantially parallel to the central axis of said valve stem in a first direction and a second direction respectively rotates said jack screw in a first direction and a second direction;
   (c) means for engaging and disengaging said sweeping motion of said elongated member and rotating motion of said valve stem wherein said means couples said sweeping motion of said elongated member and the rotating motion of said valve stem when said elongated member is pivoted substantially to said first position and said means uncouples said sweeping motion of said elongated member and said rotating motion of said valve stem when said elongated member is pivoted substantially to said second position; and
   (d) means for coupling linear movement of said jack screw in a direction substantially parallel to the central axis of said valve stem and axial movement of said valve stem in a direction substantially parallel to the central axis of said valve stem in one way, wherein rotation of said jack screw in a first direction moves said valve stem in said one way substantially parallel to the central axis of said valve stem while rotation of said jack screw in a second direction opposite to said one direction does not move said valve stem in the other way opposite to said one way.

2. A dual action valve handle comprising in combination:
  (a) a jack screw with a centrally disposed hole rotatably engaged by a valve stem, said jack screw threadedly connected to a stem housing rigidly affixed to a valve body wherein said valve stem rotatably and slidably engages and extends through a hole included in said stem housing;
  (b) an elongated member with one extremity connected to said jack screw in a pivoting relationship wherein said elongated member is pivotable about a pivoting axis substantially perpendicular to the central axis of said valve stem over a range intermediate a first position substantially perpendicular to the central axis of said valve stem and a second position substantially perpendicular to the central axis of said valve stem, wherein the sweeping motion of said elongated member about an axis substantially parallel to the central axis of said valve stem in a first direction and a second direction respectively rotates said jack screw in a first direction and a second direction;
  (c) means for engaging and disengaging said sweeping motion of said elongated member and rotating motion of said valve stem wherein said means couples said sweeping motion of said elongated member and the rotating motion of said valve stem when said elongated member is pivoted substantially to said first position and said means uncouples said sweeping motion of said elongated member and said rotating motion of said valve stem when said elongated member is pivoted substantially to said second position; and
  (d) means for coupling linear movement of said jack screw in a direction substantially parallel to the central axis of said valve stem and axial movement of said valve stem in a direction substantially parallel to the central axis of said valve stem in two ways, wherein rotation of said jack screw in a first direction moves said valve stem in one direction substantially parallel to the central axis of said valve stem and rotation of said jack screw in a second direction opposite to said first direction moves said valve stem in the other direction opposite to said one direction.

* * * * *